(12) United States Patent
Goldman et al.

(10) Patent No.: US 10,204,454 B2
(45) Date of Patent: Feb. 12, 2019

(54) METHOD AND SYSTEM FOR IMAGE GEOREGISTRATION

(71) Applicant: ELBIT SYSTEMS LAND AND C4I LTD., Netanya (IL)

(72) Inventors: Benny Goldman, Givatayim (IL); Eli Haham, Herzliya (IL)

(73) Assignee: ELBIT SYSTEMS LAND AND C4I LTD., Netanya (IL)

( * ) Notice: Subject to any disclaimer, the term of this patent is extended or adjusted under 35 U.S.C. 154(b) by 0 days.

(21) Appl. No.: 15/314,223

(22) PCT Filed: May 28, 2015

(86) PCT No.: PCT/IL2015/050554
§ 371 (c)(1),
(2) Date: Nov. 28, 2016

(87) PCT Pub. No.: WO2015/181827
PCT Pub. Date: Dec. 3, 2015

(65) Prior Publication Data
US 2017/0228878 A1 Aug. 10, 2017

(30) Foreign Application Priority Data
May 28, 2014 (IL) .......................... 232853

(51) Int. Cl.
*G06T 19/00* (2011.01)
*G06T 7/33* (2017.01)
(Continued)

(52) U.S. Cl.
CPC .......... *G06T 19/006* (2013.01); *G06K 9/6215* (2013.01); *G06T 7/344* (2017.01);
(Continued)

(58) Field of Classification Search
CPC . G06T 7/344; G06T 7/75; G06T 11/60; G06T 17/05; G06T 2207/30244; G06T 19/006; G06K 9/6215
See application file for complete search history.

(56) References Cited

U.S. PATENT DOCUMENTS 6,512,857 B1 1/2003 Hsu et al.
6,587,601 B1 * 7/2003 Hsu ........................ G01C 11/00
382/154
(Continued)

FOREIGN PATENT DOCUMENTS

IL 208600 7/2016
WO 0167749 A2 9/2001

OTHER PUBLICATIONS

Kumar et al., "Aerial Video Surveillance and Exploitation", Proceedings of the IEEE, vol. 89, No. 10 Oct. 2001.
(Continued)

*Primary Examiner* — Lin Ye
*Assistant Examiner* — Chriss S Yoder, III
(74) *Attorney, Agent, or Firm* — Mintz Levin Cohn Ferris Glovsky and Popeo, P.C.; Jonathon P. Western

(57) ABSTRACT

Image georegistration method and system. An imaging sensor acquires a sensor-image of a scene. Imaging parameters of the acquired sensor-image are obtained, the imaging parameters including at least the detected 3D position and orientation of the imaging sensor when acquiring the sensor-image, as detected using a location measurement unit. A model-image of the scene is generated from a textured 3D geographic model, the model-image representing a texture-based 2D image of the scene as acquired in the 3D model using the imaging parameters. The sensor-image and the model-image are compared and the discrepancies between them determined. An updated 3D position and orientation of the imaging sensor is determined in accordance with the discrepancies. The updated position and orientation may be used to display supplementary content overlaid on the sensor-image in relation to a selected location on the sensor-image, or for determining the geographic location coordinates of a scene element.

14 Claims, 4 Drawing Sheets

(51) Int. Cl.
G06T 7/73 (2017.01)
G06T 11/60 (2006.01)
G06K 9/62 (2006.01)
G06T 17/05 (2011.01)

(52) U.S. Cl.
CPC ............ *G06T 7/75* (2017.01); *G06T 11/60* (2013.01); *G06T 17/05* (2013.01); *G06T 2207/30244* (2013.01)

(56) References Cited

U.S. PATENT DOCUMENTS

| | | |
|---|---|---|
| 2003/0218674 A1 | 11/2003 | Zhao et al. |
| 2007/0002138 A1 | 1/2007 | Oldroyd |
| 2010/0208057 A1 | 8/2010 | Meier et al. |
| 2012/0216149 A1* | 8/2012 | Kang ................ G06F 3/04815 715/848 |
| 2013/0187952 A1* | 7/2013 | Berkovich ................ G01S 5/16 345/633 |
| 2013/0278633 A1 | 10/2013 | Ahn et al. |
| 2013/0307842 A1 | 11/2013 | Grinberg et al. |

OTHER PUBLICATIONS

Wildes et al., "Video georegistration: Algorithm and quantitative evaluation", Proceedings of Eighth IEEE International Conference on Computer Vision (ICCV), Vancouver, Jul. 2001, pp. 343-350.
Hsu et al., "Pose estimation, model refinement and enhanced visualization using video", IEEE Proc. Computer Vision and Pattern Recognition, Hilton Head, SC, 2000, pp. 488-495.
Irani et al., "Image Processing for Tomahawk Scene Matching", Johns Hopkins APL Technical Digest, vol. 15, No. 3 (1994).

* cited by examiner

METHOD AND SYSTEM FOR IMAGE GEOREGISTRATION

CROSS-REFERENCE TO RELATED APPLICATIONS

This application is a National Phase application filed under 35 U.S.C. § 371 of PCT International Application No. PCT/IL2015/050554 with an International Filing Date of May 28, 2015, which claims priority to Israel Patent Application No. 232853, filed on May 28, 2014, the entire contents of which are incorporated herein by reference.

FIELD OF THE INVENTION

The present invention generally relates to georegistration, image processing, and augmented reality.

BACKGROUND OF THE INVENTION

Augmented reality (AR) involves enhancing the perception of a real world environment with supplementary visual and/or audio content, where artificial information is overlaid onto a view of a physical environment. The supplementary content may be projected onto a personalized display device, which may be specifically adapted for AR use, such as a head-mounted display (HMD) or AR-supporting eyeglasses or contact lenses, or alternatively the display screen of a mobile computing device (e.g., a smartphone or tablet computer). The supplementary content is typically presented in real-time and in the context of elements in the current environment.

AR is increasingly utilized in a wide variety of fields, ranging from: medicine (e.g., enhancing X-ray, ultrasound or endoscopic images of the interior of a human body to assist therapeutic and diagnostic procedures); commerce (e.g., allowing a customer to view the inside of a packaged product without opening it); and education (e.g., superimposing relevant educational material to enhance student comprehension); to: military (e.g., providing combat troops with relevant target information and indications of potential dangers); entertainment (e.g., augmenting a broadcast of a sporting event or theatre performance); and tourism (e.g., providing relevant information associated with a particular location or recreating simulations of historical events). The number and variety of potential applications for AR continues to expand considerably.

In order to associate the supplementary content with the real world environment, an image of the environment captured by a camera or image sensor may be utilized, as well as telemetric data obtained from detectors or measurement systems, such as location or orientation determining systems, associated with the camera. A given camera includes various optics having particular imaging characteristics, such as the optical resolution, field of view, and focal length. These characteristics ultimately influence the parameters of the images acquired by that camera, as does the position and viewing angle of the camera with respect to the imaged scene. The measurement systems are inherently capable of supplying a certain level of accuracy or precision, but ultimately have limitations arising from the inherent precision of the various components. Such limitations may also vary depending on the particular environmental conditions (e.g., measurement accuracy may be lower during nighttime, rain or snow, or inclement weather), and may exacerbate over time due to gradual degradation of the optics and other system components. As a result, the position and orientation of the camera as acquired via the associated measurement systems may not correspond exactly to the real or true position and orientation of the camera. Such inaccuracies could be detrimental when attempting to georegister image data for displaying AR content, as it can lead to the AR content being superimposed out of context or at an incorrect relative position with respect to the relevant environmental features or elements.

PCT Patent Application No. WO 2012/004622 to Piraud, entitled "An Augmented Reality Method and a Corresponding System and Software", is directed to an augmented reality method and system for mobile terminals that involves overlaying location specific virtual information into the real images of the camera of the mobile terminal. The virtual information and also visual information about the environment at the location of the terminal is selected and downloaded from a remote database server, using as well the location (via GPS) and the orientation (via magnetometer, compass and accelerometer) of the mobile terminal. This information is continuously updated by measuring the movement of the mobile terminal and by predicting the real image content. The outline of the captured scene (i.e., crest lines of mountains in the real camera images) is compared with the outline of a terrain model of the scene at the location of the mobile terminal.

U.S. Patent Application No. 2010/0110069 to Yuan, entitled "System for Rendering Virtual See-Through Scenes", is directed to a system and method for displaying an image on a display. A three-dimensional representation of an image is obtained, and is rendered as a two-dimensional representation on the display. The location and viewing orientation of a viewer with respect to the display (e.g., the viewer's head and/or eye position, gaze location) is determined, using an imaging device associated with the display. The displayed rendering is modified based upon the determined location and viewing orientation.

U.S. Patent Application No. 2010/0110069 to Ben Tzvi, entitled "Projecting Location Based Elements over a Heads Up Display", is directed to a system and method for projecting location based elements over a heads up display (HUD). A 3D model of the scene within a specified radius of a vehicle is generated based on a digital mapping source of the scene. A position of at least one location aware entity (LAE) contained within the scene is associated with a respective position in the 3D model. The LAE from the 3D model is superimposed onto a transparent screen facing a viewer and associated with the vehicle, the superimposition being in a specified position and in the form of a graphic indicator (e.g., a symbolic representation of the LAE). The specified position is calculated based on: the respective position of the LAE in the 3D model; the screen's geometrical and optical properties; the viewer's viewing angle; the viewer's distance from the screen; and the vehicle's position and angle within the scene, such that the viewer, the graphic indicator, and the LAE are substantially on a common line.

U.S. Patent Application No. 2013/0050258 to Liu et al., entitled "Portals: Registered Objects as Virtualized Personalized Displays", is directed to a see-through head-mounted display (HMD) for providing an augmented reality image associated with a real-world object, such as a picture frame, wall or billboard. The object is initially identified by a user, for example based on the user gazing at the object for a period of time, making a gesture such as pointing at the object and/or providing a verbal command. The location and visual characteristics of the object are determined by a front-facing camera of the HMD device, and stored in a record. The user selects from among candidate data streams, such as a web page, game feed, video, or stocker ticker. Subsequently, when the user is in the location of the object and look at the object, the HMD device matches the visual characteristics of the record to identify the data stream, and displays corresponding augmented reality images registered to the object.

U.S. Patent Application No. 2013/0088577 to Hakkarainen et al., entitled "Mobile Device, Server Arrangement and Method for Augmented Reality Applications", discloses a mobile device that includes a communications interface, a digital camera, a display and an augmented reality (AR) entity. The AR entity transmits, via the communications interface, an indication of the mobile device location to an external entity. The AR entity obtains, by data transfer from the external entity via the communications interface, a representation determined on the basis of a number of 3D models of one or more virtual elements deemed as visually observable from the mobile device location, where the representation forms at least an approximation of the 3D models, and where the associated spherical surface is configured to surround the device location. The AR entity produces an AR view for visualization on the display based on the camera view and orientation-wise matching portion, such as 2D images and/or parts thereof, of the representation.

Pritt, Mark D., and LaTourette, Kevin J., "Automated Georegistration of Motion Imagery", 40th IEEE Applied Imagery Pattern Recognition Workshop (AIPRW), 2011, discloses techniques for georegistering motion imagery captured by aerial photography, based on the registration of actual images to predicted images from a high-resolution digital elevation model (DEM). The predicted image is formed by generating a shaded rendering of the DEM using the Phong reflection model along with shadows cast by the sun, and then projecting the rendering into the image plane of the actual image using the camera model (collinearity equations with radial lens distortion). The initial camera model of the first image is estimated from GPS data and an initial sensor aimpoint. The predicted image is registered to the actual image by detecting pairs of matching features using normalized cross correlation. The resulting camera model forms the initial camera estimate for the next image. An enhanced version of the algorithm uses two predicted images, where a second predicted image consists of the actual image projected into the orthographic frame of the first predicted image.

SUMMARY OF THE INVENTION

In accordance with one aspect of the present invention, there is thus provided a method for image georegistration. The method includes the procedure of acquiring at least one sensor-image of a scene with at least one imaging sensor. The method further includes the procedure of obtaining imaging parameters of the acquired sensor-image, the imaging parameters including at least the detected 3D position and orientation of the imaging sensor when acquiring the sensor-image, as detecting using at least one location measurement unit. The method further includes the procedure of generating at least one model-image of the scene from a textured 3D geographic model, the model-image representing a 2D image of the scene as acquired in the 3D geographic model using the imaging parameters, the model-image including detailed textural image content besides edge features. The method further includes the procedures of comparing the detailed image content of the sensor-image with the detailed image content of the model-image and determining the discrepancies between them, and determining an updated 3D position and orientation of the imaging sensor in accordance with the discrepancies between the sensor-image and the model-image. The method further includes the procedure of displaying supplementary content overlaid on the sensor-image, in relation to a selected location on the sensor-image, as determined based on the updated 3D position and orientation of the imaging sensor. The method may further include the procedure of determining the de the procedure of determining the geographic location coordinates of a scene element, using the 3D geographic model and the updated 3D position and orientation of the imaging sensor. The imaging parameters may further include: the range from the imaging sensor to the scene; the field of view of the imaging sensor; the focal length of the imaging sensor; the optical resolution of the imaging sensor; the dynamic range of the imaging sensor; the sensitivity of the imaging sensor; the signal-to-noise ratio (SNR) of the imaging sensor; and/or lens aberration of the imaging sensor. The 3D geographic model may include a street level view of a real-world environment. The method may further include the procedure of updating the texture data of the 3D geographic model in accordance with texture data obtained from the sensor-image. The method may further include the procedures of: tracking the location of a scene element over a sequence of image frames of the sensor-image, and displaying supplementary content overlaid on at least one image frame of the sequence of image frames, in relation to the location of the scene element in the image frame, as determined with respect to a previous image frame of the sequence of image frames. The method may further include the procedures of: obtaining at least a second set of imaging parameters for at least a second sensor-image acquired by the imaging-sensor; generating at least a second model-image of the scene from the 3D geographic model, the second model-image representing a 2D image of the scene as acquired in the 3D geographic model using the second set of imaging parameters; comparing the second sensor-image and the second model image and determining the discrepancies between them; determining an updated 3D position and orientation of the imaging sensor respective of the second sensor-image, in accordance with the discrepancies between the second sensor-image and the second model-image; and displaying supplementary content overlaid on the second sensor-image, in relation to a selected location on the second sensor-image, as determined based on the updated 3D position and orientation of the imaging sensor respective of the second sensor-image. The supplementary content may be displayed on at least a partially transparent display situated in the field of view of a user, allowing a simultaneous view of the sensor-image presented on the display and of the scene through the display. The method may further include the procedures of: comparing a new sensor-image with a previously georegistered sensor-image and determining the discrepancies therebetween; and determining an updated 3D position and orientation of the imaging sensor when acquiring the new sensor-image, in accordance with the discrepancies between the new sensor-image and the previously georegistered sensor-image.

In accordance with another aspect of the present invention, there is thus provided a system for image georegistration. The system includes at least one imaging sensor, at least one location measurement unit, a textured 3D geographic model, a processor, and a display. The processor is communicatively coupled with the imaging sensor, with the location measurement unit, with the 3D geographic model, and with the display. The imaging sensor is configured to acquire at least one sensor-image of a scene. The location measurement unit is configured to detect the 3D position and orientation of the imaging sensor when acquiring the sensor-image. The model includes imagery and texture data relating to geographical features and terrain, including artificial features. The processor is configured to obtain imaging parameters of the acquired sensor-image, the imaging parameters including at least the detected 3D position and orientation of the imaging sensor when acquiring the sensor-image as detected using the location measurement unit. The processor is further configured to generate at least one model-image of the scene from the 3D geographic model, the model-image representing a 2D image of the scene as acquired in the 3D geographic model using the imaging parameters, the model-image including detailed textural image content besides edge features. The processor is further configured to compare the detailed image content of the sensor-image with the detailed image content of the model-image and determine the discrepancies between them. The processor is further configured to determine an updated 3D position and orientation of the imaging sensor in accordance with the discrepancies between the sensor-image and the model-image. The display is configured to display supplementary content overlaid on the sensor-image, in relation to a selected location on the sensor-image, as determined based on the updated 3D position and orientation of the imaging sensor. The processor may further be configured to determine the geographic location coordinates of a scene element, using the 3D geographic model and the updated 3D position and orientation of the imaging sensor. The 3D geographic model may include a street level view of a real-world environment. The processor may further be configured to update the texture data of the 3D geographic model in accordance with texture data obtained from the sensor-image. The location measurement unit may include: a global positioning system (GPS); a compass; an inertial navigation system (INS); an inertial measurement unit (IMU); a motion sensor; a rotational sensor; and/or a rangefinder. The display may be at least a partially transparent display situated in the field of view of a user, allowing a simultaneous view of the sensor-image presented on the display and of the scene through the display. The display may include: a smartphone display screen; a camera display screen; a table computer display screen; eyeglasses; goggles; contact lenses; a wearable display device; a camera viewfinder; a head-up display (HUD); a head-mounted display (HMD); and/or a transparent display.

In accordance with yet another aspect of the present invention, there is thus provided an image georegistration module. The module is configured to obtain imaging parameters of at least one sensor-image of a scene acquired by at least one imaging sensor, the imaging parameters including at least the detected 3D position and orientation of the imaging sensor when acquiring the sensor-image as detected using at least one location measurement unit. The module is further configured to generate at least one model-image of the scene from a textured 3D geographic model, the model including imagery and texture data relating to geographical features and terrain, including artificial features, the model-image representing a 2D image of the scene as acquired in the 3D geographic model using the imaging parameters. The model-image includes detailed textural image content besides edge features. The module is further configured to compare the detailed image content of the sensor-image with the detailed image content of the model-image and determine the discrepancies therebetween, and to determine an updated 3D position and orientation of the imaging sensor in accordance with the discrepancies between the sensor-image and the model-image. The module is further configured to display supplementary content overlaid on the sensor-image, in relation to a selected location on the sensor-image, as determined based on the updated 3D position and orientation of the imaging sensor. The module may be further configured to determine the geographic location coordinates of a scene element, based on the updated 3D position and orientation of the imaging sensor. The module may be further configured to update the texture data of the 3D geographic model, in accordance with texture data obtained from the sensor-image.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a method and system for image georegistration, by utilizing a 3D geographic model to compensate for inherent inaccuracies in the measured parameters of the imaging sensor. The present invention may be used for the presentation of location-based augmented reality, where supplementary content is superimposed onto a view of a real-world environment in relation to at least one element in the environment. The method involves comparing a sensor image of a scene with a virtual image as would be acquired within the 3D model using the same parameters as used by the imaging sensor. Based on the deviations between the sensor image and the virtual image from the 3D model, the measured location (position and orientation) coordinates of the imaging sensor can be corrected to provide more accurate location coordinates. The updated sensor location can then be used to establish the correct position of an environmental element as it appears on the sensor image, in order to correctly display augmented reality content in relation to that element on the image.

Figure 1:
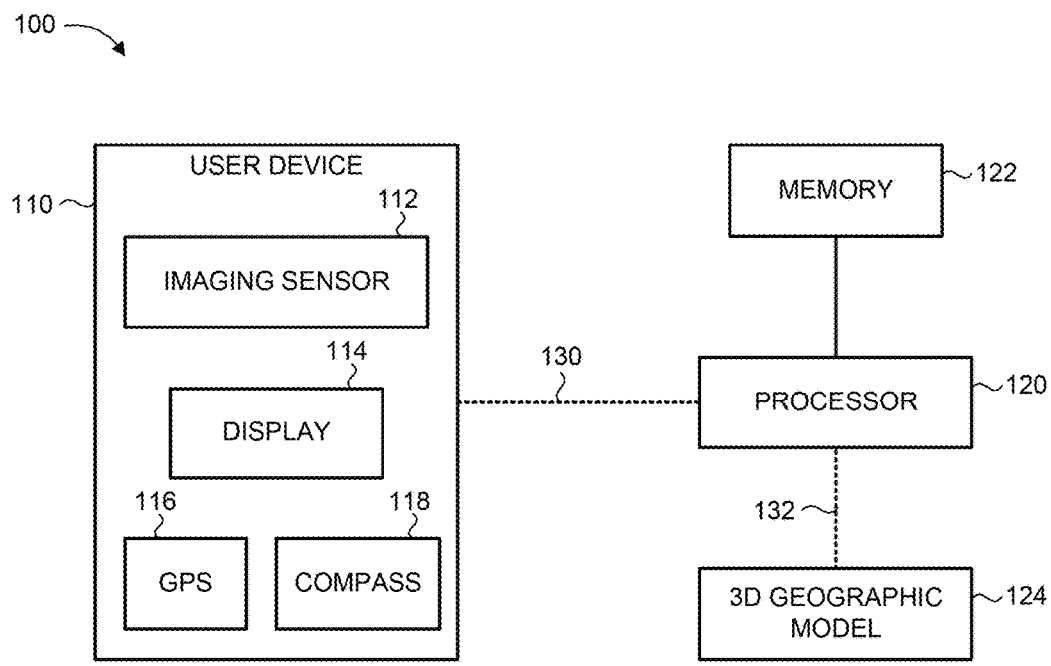
FIG. 1 is a schematic illustration of a system for image georegistration, constructed and operative in accordance with an embodiment of the present invention.

Reference is now made to FIG. 1, which is a schematic illustration of a system for image georegistration, generally referenced 100, constructed and operative in accordance with an embodiment of the present invention. System 100 includes a user device 110 that includes an imaging sensor 112, a display 114, a global positioning system (GPS) 116, and a compass 118. System 100 further includes a processor 120, a memory 122, and a three-dimensional (3D) geographic model 124. Processor is communicatively coupled with user device 110, with memory 122, and with 3D model 124.

User device 110 may be situated at a separate location from processor 120. For example, processor 120 may be part of a server, such as a remote computer or remote computer system or machine, which is accessible over a communications medium or network. Alternatively, processor 120 may be integrated within user device 110. If user device 110 and processor 120 are remotely located (as shown in FIG. 1), then a data communication channel 130 (e.g., a wireless link) enables data communication between processor 120 and the components of user device 110. Similarly, processor 120 may be situated at a separate location from 3D model 124, in which case a data communication channel 132 (e.g., a wireless link) enables data transmission between 3D model 124 and processor 120.

User device 110 may be any type of computational device or machine containing at least an imaging sensor 112 and position and orientation determining components (such as GPS 116 and compass 118). For example, user device 110 may be embodied by: a smartphone, a mobile phone, a camera, a laptop computer, a netbook computer, a tablet computer, a handheld computer, a personal digital assistant (PDA), a portable media player, a gaming console, or any combination of the above. It is noted that display 114 may be integrated within user device 110 (as shown in FIG. 1) or otherwise associated therewith, or alternatively display 114 may be part of a separate device that is accessible to and viewable by a user. For example, display 114 may be embodied by: the display screen of a computational device (e.g., a smartphone display screen, a tablet computer display screen, a camera display screen and the like); a wearable display device (e.g., goggles, eyeglasses, contact lenses, a head-mounted display (HMD), and the like); a monitor; a head-up display (HUD); a camera viewfinder; and the like. Display 114 may be at least partially transparent, such that the user viewing display 114 can simultaneously observe images superimposed onto the display together with a view of a physical scene through the display.

Imaging sensor 112 may be any type of device capable of acquiring and storing an image representation of a real-world scene, including the acquisition of any form of electromagnetic radiation at any range of wavelengths (e.g., light in the visible or non-visible spectrum, ultraviolet, infrared, radar, microwave, RF, and the like). Imaging sensor 112 is operative to acquire at least one image frame, such as a sequence of consecutive image frames representing a video image, which may be converted into an electronic signal for subsequent processing and/or transmission. Accordingly, the term "image" as used herein refers to any form of output from an aforementioned image sensor, including any optical or digital representation of a scene acquired at any spectral region.

GPS 116 and compass 118 represent exemplary instruments configured to measure, respectively, the position and orientation of user device 110. User device 110 may alternatively include other position and/or orientation measurement instruments, which may be embodied by one or more devices or units, including but not limited to: an inertial navigation system (INS); an inertial measurement unit (IMU); motion sensors or rotational sensors (e.g., accelerometers, gyroscopes, magnetometers); a rangefinder; and the like.

Data communication channels 130, 132 may be embodied by any suitable physical or logical transmission medium operative for conveying an information signal between two points, via any type of channel model (digital or analog) and using any transmission protocol or network (e.g., radio, HF, wireless, Bluetooth, cellular, and the like). User device 110 may further include a transceiver (not shown) operative for transmitting and/or receiving data through communication channel 130.

3D geographic model 124 may be any type of three-dimensional representation of the Earth or of a particular area, region or territory of interest. Such a 3D model may include what is known in the art as a: "virtual globe", "digital elevation model (DEM)", "digital terrain model (DTM)", "digital surface model (DSM)", and the like. 3D model 124 generally includes imagery and texture data relating to geographical features and terrain, including artificial features (e.g., buildings, monuments, and the like), such as the location coordinates of such features and different views thereof (e.g., acquired via satellite imagery or aerial photography, and/or street level views). For example, 3D model 124 can provide a plurality of visual representations of the geographical terrain of a region of interest at different positions and viewing angles (e.g., by allowing manipulation operations such as zooming, rotating, tilting, etc). 3D model 124 may include a proprietary and/or publically accessible model (e.g., via open-source platforms), or may include a model that is at least partially private or restricted. Some examples of publically available 3D models include: Google Earth™; Google Street View™; NASA World Wind™; Bing Maps™; Apple Maps; and the like.

The components and devices of system 100 may be based in hardware, software, or combinations thereof. It is appreciated that the functionality associated with each of the devices or components of system 100 may be distributed among multiple devices or components, which may reside at a single location or at multiple locations. For example, the functionality associated with processor 120 may be distributed between multiple processing units (such as a dedicated image processor for the image processing functions). System 100 may optionally include and/or be associated with additional components (not shown) for performing the functions of the disclosed subject matter, such as: a user interface, external memory, storage media, microprocessors, databases, and the like.

Figure 2:
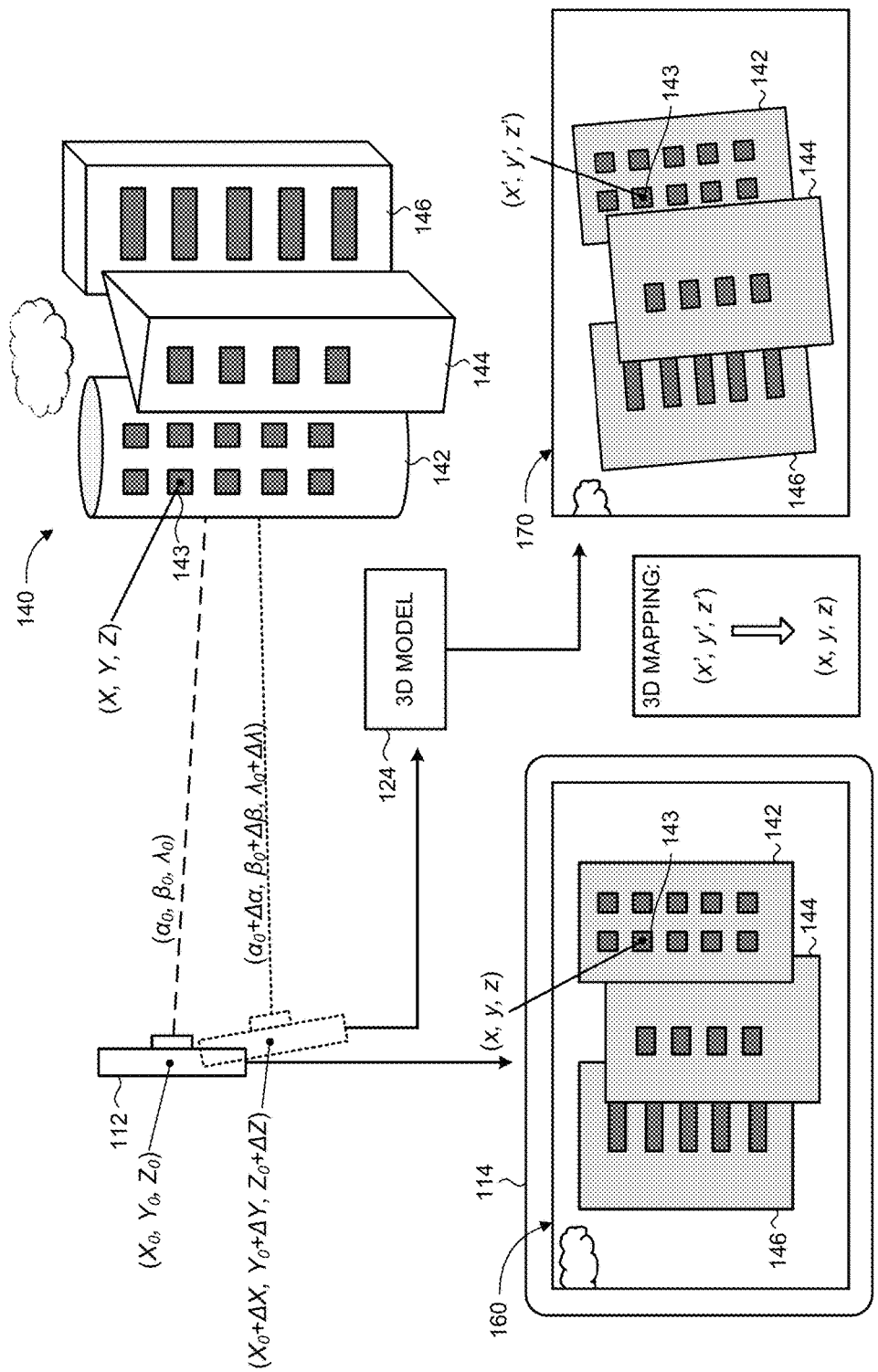
FIG. 2 is a schematic illustration of an exemplary scene and the resultant images obtained with the system of FIG. 1, operative in accordance with an embodiment of the present invention.

Reference is now made to FIG. 2, which is a schematic illustration of an exemplary scene and the resultant images obtained with the system of FIG. 1, operative in accordance with an embodiment of the present invention. A real-world scene 140 of an area of interest is imaged by imaging sensor 112 of user device 110, resulting in image 160. Scene 140 includes a plurality of buildings, referenced 142, 144 and 146, respectively, which appear on sensor image 160. While acquiring image 160, imaging sensor 112 is situated at a particular position and at a particular orientation or viewing angle relative to a reference coordinate frame, indicated by respective position coordinates $(X_0, Y_0, Z_0)$ and viewing angle coordinates $(\alpha_0, \beta_0, \lambda_0)$ of imaging sensor 112 in three-dimensional space (six degrees of freedom). The position coordinates and viewing angle coordinates of imaging sensor 112 are determined by GPS 116 and compass 118 of user device 110. Imaging sensor 112 is further characterized by additional parameters that may influence the characteristics of the acquired image 160, such as for example: field of view; focal length; optical resolution; dynamic range; sensitivity; signal-to-noise ratio (SNR); lens aberrations; and the like. In general, the term "imaging parameters" as used herein encompasses any parameter or characteristic associated with an imaging sensor that may influence the characteristics of a particular image obtained by that imaging sensor. Accordingly, sensor-image 160 depicts buildings 142, 144, 146 from a certain perspective, which is at least a function of the position and the orientation (and other relevant imaging parameters) of imaging sensor 112 during the acquisition of image 160. Sensor-image 160 may be converted to a digital signal representation of the captured scene 140, such as in terms of pixel values, which is then forwarded to processor 120. The image representation may also be provided to display 114 for displaying the sensor-image 160.

Scene 140 includes at least one target element 143, which is represented for exemplary purposes by a window of building 142. Target element 143 is geolocated at position coordinates (X, Y, Z). As discussed previously, imaging sensor 112 is geolocated at position and orientation coordinates $(X_0, Y_0, Z_0; \alpha_0, \beta_0, \lambda_0)$, relative to the same reference coordinate frame. However, due to inherent limitations in the accuracy of the location measurement components of user device 110 (e.g., as a result of environmental factors, degradation over time, and/or intrinsic limits in the degree of precision attainable by mechanical components), the geolocation coordinates of imaging sensor 112 as detected by GPS 116 and compass 118 may have certain deviations with respect to the true or actual geolocation coordinates of imaging sensor 112. Thus, the detected geolocation of imaging sensor 112 is at deviated position and orientation coordinates $(X_0+\Delta X, Y_0+\Delta Y, Z_0+\Delta Z; \alpha_0+\Delta \alpha, \beta_0+\Delta \beta, \lambda_0+\Delta \lambda)$. As a result, if augmented reality content associated with target element 143 were to be superimposed onto sensor-image 160 based on the geolocation of target element 143 relative to the detected geolocation of imaging sensor 112, the AR content may appear on image 160 at a different location than that of target element 143, and may thus be confused or mistaken by a viewer as being associated with a different element (e.g., another object or region of scene 140).

Figure 3A:
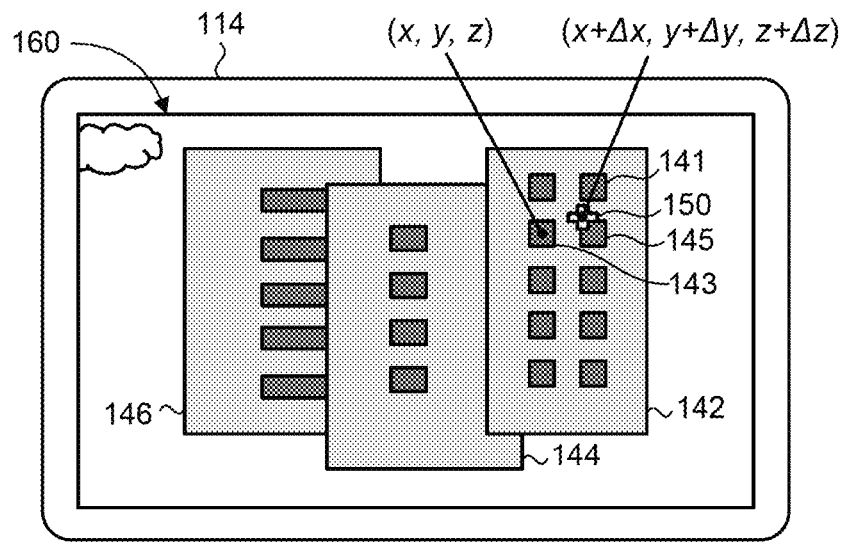
FIG. 3A is a schematic illustration of exemplary supplementary content being inaccurately superimposed onto a sensor-image, operative in accordance with an embodiment of the present invention.

Reference is now made to FIG. 3A, which is a schematic illustration of exemplary supplementary content being inaccurately superimposed onto a sensor-image, operative in accordance with an embodiment of the present invention. Sensor-image 160, as viewed through display 114, depicts buildings 142, 144, 146 at a certain perspective. A reticle 150 is to be superimposed onto window 143 of building 142, in order to present to the viewer of display 114 relevant information about that window 143 (for example, to indicate to the viewer that this window 143 represents the window of an office that he/she is intending to visit). User device 110 assumes the geolocation of imaging sensor 112 to be at deviated coordinates $(X_0+\Delta X, Y_0+\Delta Y, Z_0+\Delta Z; \alpha_0+\Delta \alpha, \beta_0+\Delta \beta, \lambda_0+\Delta \lambda)$, and therefore assumes window 143 to be located on sensor-image 160 at image plane coordinates $(x+\Delta x, y+\Delta y, z+\Delta z)$, as determined based on the geolocation of window 143 (X, Y, Z) relative to the (deviated) geolocation of imaging sensor 112, using a suitable camera model. As a result, the reticle 150 is superimposed on sensor-image 160 at image plane coordinates $(x+\Delta x, y+\Delta y, z+\Delta z)$. However, since the true location of window 143 on sensor-image 160 is at image plane coordinates (x, y, z), reticle 150 appears slightly away from window 143 on sensor-image 160. Consequently, the viewer may inadvertently think that reticle 150 is indicating a different window, such as window 141 or window 145, rather than window 143. It is appreciated that the present disclosure uses capital letters to denote real-world geolocation coordinates (e.g., X, Y, Z), while using lower case letters to denote image coordinates (e.g., x, y, z).

Referring back to FIG. 2, processor 120 obtains a copy of sensor-image 160 along with the detected position coordinates $(X_0+\Delta X, Y_0+\Delta Y, Z_0+\Delta Z)$ and viewing angle coordinates $(\alpha_0+\Delta \alpha, \beta_0+\beta, \lambda_0+\Delta \lambda)$ of imaging sensor 112 (and any other relevant imaging parameters) from user device 110. Processor 120 then proceeds to generate a corresponding image 170 of scene 140 based on 3D model 124. In particular, processor 120 generates a virtual image of the real-world representation of scene 140 contained within 3D model 124 (e.g., using 3D rendering techniques), where the virtual image is what would be acquired by a hypothetical imaging sensor using the imaging parameters associated with sensor-image 160 as obtained from user device 110. The resultant model-image 170 should appear quite similar, and perhaps nearly identical, to sensor-image 160 since similar imaging parameters are applied to both images 160, 170. For example, the portions of buildings 142, 144, 146 that were visible on sensor-image 160 are also visible on model-image 170, and appear at a similar perspective. Nevertheless, there may be certain variations and discrepancies between images 160 and 170, arising from the inaccuracy of the detected geolocation of imaging sensor 112 by user device 110, relative to its true geolocation, as discussed hereinabove. In particular, model-image 170 is based on a (hypothetical) imaging sensor geolocated at (deviated) coordinates $(X_0+\Delta X, Y_0+\Delta Y, Z_0+\Delta Z; \alpha_0+\alpha, \beta_0+\beta, \lambda_0+\lambda)$ when imaging scene 140, since those are the imaging parameters that were detected by user device 110, whereas sensor-image 160 is based on (actual) imaging sensor 112 that was geolocated at (true) coordinates $(X_0, Y_0, Z_0; \alpha_0, \beta_0, \lambda_0)$ when imaging scene 140. Consequently, the mapping of window 143 on model-image 170 is at image plane coordinates (x', y', z') that are slightly different from the image plane coordinates (x, y, z) of window 143 on sensor-image 160.

Subsequently, processor 120 compares the sensor-image 160 with the model-image 170, and determines the discrepancies between the two images in three-dimensional space or six degrees of freedom (6DoF) (i.e., encompassing translation and rotation in three perpendicular spatial axes). In particular, processor 120 may use image registration techniques known in the art (e.g., intensity-based or feature-based registration), to determine the corresponding locations of common points or features in the two images 160, 170. Processor 120 may determine a suitable 3D transform (mapping) that would map model-image 170 onto sensor-image 160 (or vice-versa), which may include linear transforms (i.e., involving rotation, scaling, translation, and other affine transforms) and/or non-linear transforms.

After the model-image 170 and sensor-image 160 have been compared, processor 120 can then determine the true geolocation of imaging sensor 112 based on the discrepancies between the two images 160, 170. Consequently, deviations in the image contents displayed in sensor-image 160 arising from the inaccuracy of the detected geolocation of imaging sensor 112 can be corrected, allowing geographically-registered AR content to be accurately displayed on sensor-image 160. In particular, processor 120 determines an updated position and orientation of imaging sensor 112, which would result in model-image 170 being mapped onto sensor-image 160 (i.e., such that the image location of a selected number of points or features in model-image 170 would substantially match the image location of those corresponding points or features as they appear in sensor-image 160, or vice-versa). In other words, the updated geolocation (position and orientation) of imaging sensor 112 corresponds to the geolocation of a (hypothetical) imaging sensor that would have acquired an updated model-image resulting from the mapping of model-image 170 onto sensor-image 160. The determined updated geolocation of imaging sensor 112 should correspond to its actual or true geolocation when acquiring sensor-image 160 (i.e., position coordinates $X_0$, $Y_0$, $Z_0$; and orientation coordinates $\alpha_0$, $\beta_0$, $\lambda_0$).

Supplementary AR content can then be accurately displayed on sensor-image 160 in relation to a selected image location or in relation to the real-world geolocation of an object or feature in scene 140 that appears on sensor-image 160, in accordance with the updated geolocation of imaging sensor 112. For example, user device 110 identifies at least one scene element viewable on sensor-image 160, in relation to which supplementary AR content is to be displayed. User device 110 determines the real-world geolocation of the scene element, and then determines the corresponding image location of the scene element on sensor-image 160, based on the geolocation of the scene element with respect to the updated geolocation of imaging sensor 112 (as determined by processor 112 from the discrepancies between model-image 170 and sensor-image 160). Display 114 then displays the supplementary AR content on sensor-image 160 at the appropriate image location relative to the determined image location of the scene element on sensor-image 160. In this manner, an "inaccurate" image location of the scene element as initially determined based on the (inaccurate) detected geolocation of imaging sensor 112, may be corrected to the "true" image location of the scene element as it actually appears on sensor-image 160, such that geographically-registered AR content can be accurately displayed on sensor-image 160 in conformity with the location of the scene element on the sensor-image. It is appreciated that the term "scene element" as used herein may refer to any point, object, entity, or feature (or a group of such points, objects, entities or features) that are present in the sensor-image acquired by the imaging sensor of the present invention. Accordingly, the "image location of a scene element" may refer to any defined location point associated with such a scene element, such as an approximate center of an entity or feature that appears in the sensor-image.

Figure 3B:
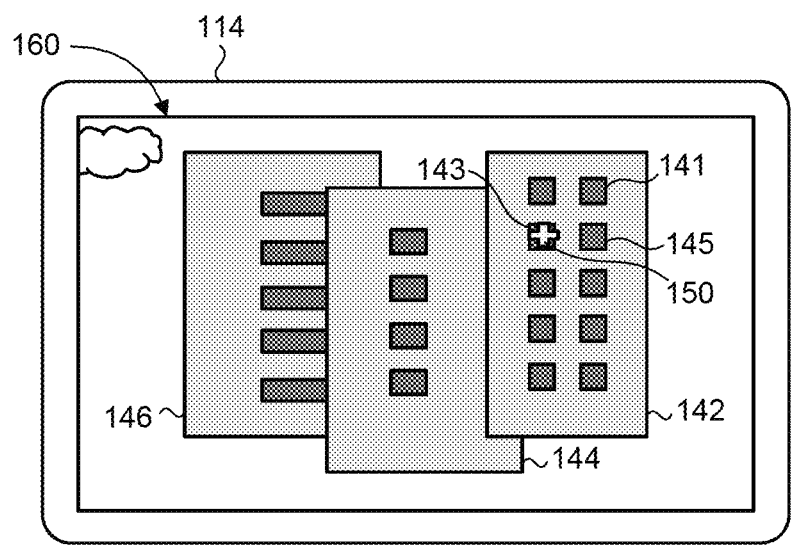
FIG. 3B is a schematic illustration of the exemplary supplementary content of FIG. 3A being accurately superimposed onto the sensor-image, operative in accordance with an embodiment of the present invention.

Reference is now made to FIG. 3B, which is a schematic illustration of the exemplary supplementary content of FIG. 3A being accurately superimposed onto the sensor-image, operative in accordance with an embodiment of the present invention. Following the example depicted in FIG. 3A, a reticle 150 is to be superimposed onto window 143 of building 142, in order to present relevant information about window 143 to the viewer of display 114. User device 110 initially assumes the geolocation of imaging sensor 112 to be at (deviated) geolocation coordinates ($X_0+\Delta X$, $Y_0+\Delta Y$, $Z_0+\Delta Z$; $\alpha_0+\Delta\alpha$, $\beta_0+\Delta\beta$, $\lambda_0+\Delta\lambda$), based on which reticle 150 would be superimposed at deviated image plane coordinates ($x+\Delta x$, $y+\Delta y$, $z+\Delta z$) on sensor-image 160 (FIG. 3A). Processor 120 determines updated geolocation coordinates of imaging sensor 112 ($X_0$, $Y_0$, $Z_0$; $\alpha_0$, $\beta_0$, $\lambda_0$), in accordance with the discrepancies between sensor-image 160 and model-image 170. User device 110 then determines updated image plane coordinates of window 143 on sensor-image 160 (x, y, z), based on the real-world geolocation coordinates of window 143 (X, Y, Z) relative to the updated real-world geolocation coordinates of imaging sensor 112 ($X_0$, $Y_0$, $Z_0$; $\alpha_0$, $\beta_0$, $\lambda_0$). Reticle 150 is then superimposed on sensor-image 160 at the updated image plane coordinates (x, y, z), such that it appears at the same location as window 143 on sensor-image 160 (i.e., at the true image location of window 143). Consequently, the viewer of display 114 sees reticle 150 positioned directly onto window 143 of building 142, so that it is clear that the reticle 150 is indicating that particular window 143, rather than a different window in the vicinity of window 143 (such as windows 141, 145).

It is appreciated that the supplementary AR content projected onto display 114 may be any type of graphical or visual design, including but not limited to: text; images; illustrations; symbology; geometric designs; highlighting; changing or adding the color, shape, or size of the image feature (environmental element) in question; and the like. Furthermore, supplementary AR content may include audio information, which may be presented in addition to, or instead of, visual information, such as the presentation of video imagery or relevant speech announcing or elaborating upon features of interest that are viewable in the displayed image.

The operator of user device 110 viewing image 160 on display 114 may designate at least one object of interest on image 160, and then processor 120 may display appropriate AR content related to the designated object(s) of interest. For example, referring to FIG. 2, the operator may select building 146 on image 160, such as via a speech command or by marking building 146 with a cursor or touch-screen interface on display 114. In response, processor 120 identifies the designated object as representing building 146, determines relevant information regarding the designated object, and then projects relevant supplementary content in relation to that designated object (such as the address, a list of occupants or shops residing in that building, and the like) superimposed onto image 160 viewed on display 114, in conformity with the location of building 146 as it appears on image 160.

Processor 120 may also use the updated geolocation of imaging sensor 112 to extract correct real-world geolocation information relating to scene 140, without necessarily projecting supplementary AR content on sensor-image 160. For example, processor 120 may determine the real-world geolocation coordinates of an object or feature in scene 140, such as the real-world geolocation of window 143, from 3D model 124, based on the determined updated geolocation of imaging sensor 112. In particular, processor 120 identifies the updated geolocation coordinates of imaging sensor 112 ($X_0$, $Y_0$, $Z_0$; $\alpha_0$, $\beta_0$, $\lambda_0$) in 3D model 124, and projects a vector extending from the imaging sensor coordinates to the object of interest coordinates within the 3D model, the projection vector having a length corresponding to the range from the imaging sensor geolocation to the object of interest geolocation (where the range is determined using any suitable means, such as a rangefinder). For example, processor 120 determines the coordinates of a vector in 3D model 124 extending from the updated geolocation coordinates of imaging sensor 112 ($X_0$, $Y_0$, $Z_0$; $\alpha_0$, $\beta_0$, $\lambda_0$) and having a length equal to the range from imaging sensor 112 to window 143, such that the end position of the vector indicates the geolocation coordinates of window 143 (X, Y, Z).

According to an embodiment of the present invention, geographically-registered supplementary content may be projected onto a sequence of displayed images with imaging parameters that change over time, where the position and orientation of the image contents is tracked and the relevant AR content is updated accordingly. For example, referring to FIG. 2, imaging sensor 112 may acquire a second image (not shown) of scene 140, at a different position and viewing angle (e.g., $X_1$, $Y_1$, $Z_1$; $\alpha_1$, $\beta_1$, $\lambda_1$) than that associated with the previous image 160. Correspondingly, user device 110 would detect an inaccurate geolocation of imaging sensor 112 during the acquisition of the second sensor-image (e.g., at deviated coordinates ($X_1+\Delta X_1$, $Y_1+\Delta Y_1$, $Z_1+\Delta Z_1$; $\alpha_1+\Delta\alpha_1$, $\beta_1+\Delta\beta_1$, $\lambda_1+\Delta\lambda_1$), and would therefore map window 143 on the second sensor-image at a second set of deviated image coordinates (e.g., $x+\Delta x_1$, $y+\Delta y_1$, $z+\Delta z_1$) which differs from the window coordinates in the first sensor-image (x, y, z). In order to present correctly georegistered AR content associated with window 143 on the second sensor-image, one approach is to repeat the aforementioned process described for a single image. In particular, processor 120 generates a second model-image from 3D model 124, the second model-image representing a virtual image as acquired in 3D model 114 with a hypothetical imaging sensor using the detected imaging parameters associated with the second model-image. Processor 120 then compares and determines discrepancies between the second model-image and the second sensor-image, and determines the image plane coordinates of window 143 on the second sensor-image based on the geolocation of window 143 with respect to an updated geolocation of imaging sensor 112 as determined from the discrepancies between the second model-image and the second sensor-image. The relevant supplementary AR content (e.g., reticle 150) is then displayed at the determined image plane coordinates on the second sensor-image, such that reticle 150 will be displayed at the same image location as window 143 as it actually appears on the second sensor-image. A second approach is to utilize standard image tracking techniques to track the location of the scene element between image frames in order to determine the correct placement for superposition of the AR content in subsequent frames, and then intermittently apply the aforementioned process (i.e., determining an updated model-image, comparing with the associated sensor-image, and determining an updated geolocation of imaging sensor 112 accordingly) after a selected number of frames in order to "recalibrate". An additional approach would be to incorporate predicted values of the imaging sensor geolocation (i.e., predicting the future location of the operator of user device 110), in accordance with a suitable prediction model.

According to another embodiment of the present invention, geographically-registered supplementary content may be projected onto multiple displayed images of the same (or a similar) scene, acquired by a plurality of imaging sensors, each being associated with respective imaging parameters. For example, a plurality of imaging sensors (112A, 112B, 112C) may acquire a plurality of respective sensor-images (160A, 160B, 160C) of scene 140, each sensor-image being associated with at least a respective position and viewing angle (and other relevant imaging parameters). Thus, window 143 of building 142 may appear at a slightly different image location at each of the respective sensor-images 160A, 160B, 160C. Processor 120 generates a set of model-images from 3D model 124, each model-image (170A, 170B, 170C) respective of each of the sensor-images (160A, 160B, 160C) based on the associated detected imaging parameters. Subsequently, processor 120 compares between each sensor-image and its respective model-image (170A, 170B, 170C), and determines the discrepancies and deviations between each pair of images. Processor 120 then determines the true geolocation of each imaging sensor (112A, 112B, 112C) for its respective sensor-image (160A, 160B, 160C), based on the discrepancies between each sensor-image (160A, 160B, 160C) and its respective model-image (170A, 170B, 170C). A selected image location (e.g., associated with a scene element) is then determined for each sensor-image (160A, 160B, 160C) based on the determined real-world geolocation of the respective imaging sensor (112A, 112B, 112C), and the respective supplementary AR content is superimposed at the correct geographically-registered image coordinates on each of the sensor-images (160A, 160B, 160C) presented on a plurality of displays (114A, 114B, 11C). An example of such a scenario may be a commander of a military sniper unit who is directing multiple snipers on a battlefield, where the commander and each of the snipers are viewing the potential target at different positions and viewing angles through the sighting device of their respective weapons. The commander may then indicate to each of the snipers the exact position of the desired target with respect to the particular image being viewed by that sniper, in accordance with the present invention. In particular, images of the potential target acquired by the cameras of each sniper are processed, and a model-image respective of each sniper's image is generated using the 3D geographic model, based on the detected imaging parameters associated with the respective sniper image. The discrepancies between each model-image and the respective sniper image are determined, and the geolocation of each sniper camera for its respective sniper image is determined based on these discrepancies. Subsequently, an appropriate symbol (such as a reticle) can be superimposed onto the sighting device being viewed by each respective sniper, at the image location of the desired target as it appears on the respective sniper's image.

According to a further embodiment of the present invention, 3D geographic model 124 may be updated based on real-time information, such as information obtained in the acquired sensor-image 160, following the image georegistration process. In particular, after the updated geolocation of imaging sensor 112 has been determined in accordance with the discrepancies between sensor-image 160 and model-image 170, the texture data contained within 3D model 124 may be amended to conform with real-world changes in the relevant geographical features or terrain. For example, processor may identify a discrepancy between a particular characteristic of a geographical feature as it appears in recently acquired sensor-image 160 and the corresponding characteristic of the geographical feature as currently defined in 3D model 124, and then proceed to update 3D model 124 accordingly.

It is appreciated that 3D geographic model 124 may be stored in a remote server or database, and may be accessed by processor 120 partially or entirely, as required. For example, processor 120 may retrieve only the relevant portions of 3D model 124 (e.g., only the portions relating to the particular region or environment where scene 140 is located), and store the data in a local cache memory for quicker access. Processor 120 may also utilize the current geolocation of user device 110 (i.e., as detected using GPS 116) in order to identify a suitable 3D geographic model 124, or section thereof, to retrieve. In other words, a location-based 3D model 124 may be selected in accordance with the real-time geolocation of user device 110.

According to yet another embodiment of the present invention, information relating to georegistered images over a period of time may be stored, and then subsequent image georegistration may be implemented using the previously georegistered images, rather than using 3D model 124 directly. For example, a database (not shown) may store the collection of sensor-images captured by numerous users of system 100, along with relevant image information and the associated true position and orientation coordinates as determined in accordance with the discrepancies between the sensor-image and corresponding model-image generated from 3D model 124. After a sufficient amount of georegistered sensor-images have been collected, then subsequent iterations of georegistration may bypass 3D model 124 entirely. For example, system 100 may identify that a new sensor-image was captured at a similar location to a previously georegistered sensor-image (e.g., by identifying a minimum of common environmental features or image attributes in both images). System 100 may then determine an updated position and orientation for the new sensor-image directly from the (previously determined) position and orientation of the previously georegistered sensor-image at the common location (based on the discrepancies between the two images), rather than from a model-image generated for the new sensor-image.

Figure 4:
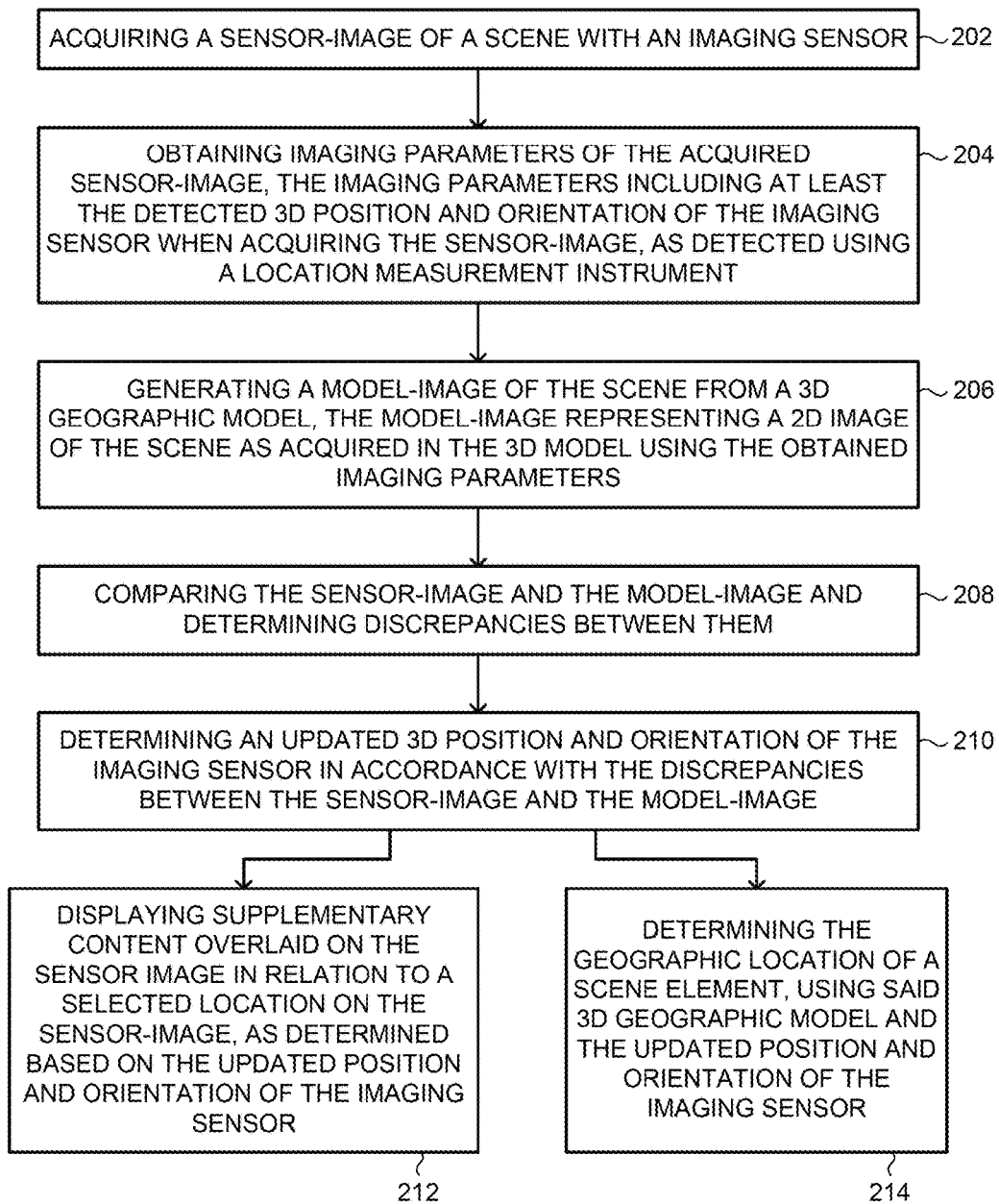
FIG. 4 is a block diagram of a method for image georegistration, operative in accordance with an embodiment of the present invention.

Reference is now made to FIG. 4, which is a block diagram of a method for image georegistration, operative in accordance with an embodiment of the present invention. In procedure 202, a sensor-image of a scene is acquired with an imaging sensor. Referring to FIGS. 1 and 2, imaging sensor 112 acquires an image 160 of scene 140 that includes a plurality of buildings 142, 144, 146.

In procedure 204, imaging parameters of the acquired sensor-image are obtained, the imaging parameters including at least the detected 3D position and orientation of the imaging sensor when acquiring the sensor-image, as detected using as least one location measurement unit. Referring to FIGS. 1 and 2, processor 120 receives imaging parameters associated with the acquired sensor-image 160 from user device 110. The imaging parameters includes at least the real-world geolocation (position and orientation) of imaging sensor 112 while acquiring sensor-image 160, as detected via GPS 116 and compass 118 of user device 110. The detected geolocation of imaging sensor 112 includes position coordinates $(X_0+\Delta X, Y_0+\Delta Y, Z_0+\Delta Z)$ and viewing angle coordinates $(\alpha_0+\Delta\alpha, \beta_0+\beta, \lambda_0+\lambda)$, which are deviated with respect to the true or actual position coordinates $(X_0, Y_0, Z_0)$ and orientation coordinates $(\alpha_0, \beta_0, \lambda_0)$ of imaging sensor 112 in three-dimensional space (six degrees of freedom).

In procedure 206, a model-image of the scene is generated from a 3D geographic model, the model-image representing a 2D image of the scene as acquired in the 3D model using the obtained imaging parameters. Referring to FIGS. 1 and 2, processor 120 generates a model-image 170 of scene 140 based on the 3D geographic data contained in 3D model 124. The model-image 170 is a virtual image that would be acquired by a hypothetical imaging sensor imaging scene 140 using the imaging parameters obtained from user device 110, where the imaging parameters includes the detected geolocation of imaging sensor 112 while acquiring sensor-image 160, as detected via GPS 116 and compass 118. Accordingly, the model-image 170 is based on a hypothetical imaging sensor geolocated at deviated coordinates $(X_0+\Delta X, Y_0+\Delta Y, Z_0+\Delta Z; \alpha_0+\Delta\alpha, \beta_0+\Delta\beta, \lambda_0+\Delta\lambda)$ when imaging scene 140. Model-image 170 should depict mostly the same environmental features (i.e., buildings 142, 144, 146) depicted in sensor-image 160, but they may be located at slightly different image plane coordinates in the two images.

In procedure 208, the sensor-image and the model-image is compared, and discrepancies between the sensor-image and the model-image are determined. Referring to FIGS. 1 and 2, processor 120 compares sensor-image 160 with model-image 170, and determines the deviations or discrepancies between the two images 160, 170 in three-dimensional space (six degrees of freedom). Processor 120 may use image registration techniques known in the art to determine the corresponding locations of common points or features in the two images 160, 170, and may determine a transform or mapping between the two images 160, 170.

In procedure 210, an updated 3D position and orientation of the imaging sensor is determined in accordance with the discrepancies between the sensor-image and the model-image. Referring to FIG. 2, processor 120 determines an updated geolocation of imaging sensor 112 based on the discrepancies between sensor-image 160 and model-image 170. In particular, processor 120 determines an updated position and orientation of imaging sensor 112, such that the image location of a selected number of points or features in model-image 170 would substantially match the image location of those corresponding points or features as they appear in sensor-image 160 (or vice-versa). The determined updated geolocation of imaging sensor 112 $(X_0, Y_0, Z_0; \alpha_0, \beta_0, \lambda_0)$ should correspond to its actual or true geolocation when acquiring sensor-image 160.

In procedure 212, supplementary content is displayed overlaid on the sensor-image in relation to a selected location on the sensor-image, as determined based on the updated position and orientation of the imaging sensor. Referring to FIGS. 2 and 3B, user device 110 determines the image plane coordinates of window 143 on sensor-image 160 (x, y, z), based on the real-world geolocation coordinates of window 143 (X, Y, Z) relative to the updated real-world geolocation coordinates of imaging sensor 112 $(X_0, Y_0, Z_0; \alpha_0, \beta_0, \lambda_0)$. A reticle 150 is superimposed onto sensor-image 160 at the determined image coordinates of window 143 (x, y, z), such that the viewer of display 114 sees reticle 150 positioned directly over window 143 on sensor-image 160.

In procedure 214, the geographic location of a scene element is determined, using the 3D geographic model and the updated position and orientation of the imaging sensor. Referring to FIGS. 2 and 3B, processor 120 determines the real-world geolocation coordinates of window 143 (X, Y, Z), as indicated by the coordinates of a vector in 3D model 124 extending from the updated geolocation coordinates of imaging sensor 112 $(X_0, Y_0, Z_0; \alpha_0, \beta_0, \lambda_0)$ and having a length equal to the range from imaging sensor 112 to window 143. The determined geolocation coordinates (X, Y, Z) may then be indicated to the viewer if desired, such as being indicated on sensor-image 160 as viewed on display 114.

The present invention is applicable to augmented reality presentation for any purpose, and may be employed in a wide variety of applications, for projecting any type of graphical imagery or AR content onto a real-world environment in order to modify the viewer's perception of that environment. For example, the present invention may be utilized for various military objectives, such as for guiding troops, directing weaponry, and providing target information or indications of potential dangers. Another example is for security related applications, such as for analyzing surveillance imagery, directing surveillance cameras towards a particular target, or assisting the deployment of security personnel at a crime scene. Yet another potential application is for navigation, such as providing directions to a specific location at a particular street or building. Further exemplary applications include education (e.g., such as augmenting an illustration of a particular topic or concept to enhance student comprehension); entertainment (e.g., such as by augmenting a broadcast of a sporting event or theatre performance); and tourism (e.g., such as by providing relevant information associated with a particular location or recreating simulations of historical events).

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for real-time image georegistration, the method comprising the procedures of:
   acquiring at least one sensor image of a scene with at least one imaging sensor of a user device;
   obtaining, by a processor of said user device, imaging parameters of the acquired sensor image, said imaging parameters comprising at least the detected three dimensional (3D) position and orientation of said imaging sensor when acquiring said sensor image, as detected using at least one location measurement unit of said user device;
   generating, by said processor, at least one model image of said scene from a textured 3D geographic model communicatively coupled with said user device and comprising a plurality of visual representations of real-world environments at different positions and viewing angles, including street-level views, said model image representing a two dimensional (2D) image of said scene as would be acquired in said 3D geographic model by a hypothetical image sensor using said imaging parameters, said model image comprising detailed textural image content besides edge features, said model image extractable from said 3D geographic model from different positions and viewing angles;
   comparing, by said processor, the detailed image content of said sensor image with the detailed image content of said model image and determining discrepancies therebetween;
   determining, by said processor, an updated 3D position and orientation of said imaging sensor in accordance with the discrepancies between said sensor image and said model image; and
   displaying in real-time supplementary content overlaid on said sensor image, with a display of said user device, in relation to a selected location on said sensor image, as determined based on said updated 3D position and orientation of said imaging sensor.

2. The method of claim 1, further comprising the procedure of determining the geographic location coordinates of a scene element, using said 3D geographic model and said updated 3D position and orientation of said imaging sensor.

3. The method of claim 1, wherein said imaging parameters further comprises at least one parameter selected from the list consisting of:
   range from said imaging sensor to said scene;
   field of view of said imaging sensor;
   focal length of said imaging sensor;
   optical resolution of said imaging sensor;
   dynamic range of said imaging sensor;
   sensitivity of said imaging sensor;
   signal to noise ratio (SNR) of said imaging sensor; and
   lens aberrations of said imaging sensor.

4. The method of claim 1, further comprising the procedure of updating the texture data of said 3D geographic model, in accordance with texture data obtained from said sensor image.

5. The method of claim 1, further comprising the procedures of:
   tracking the location of a scene element over a sequence of image frames of said sensor image; and
   displaying supplementary content overlaid on at least one image frame of said sequence of image frames, in relation to the location of said scene element in said image frame, as determined with respect to a previous image frame of said sequence of image frames.

6. The method of claim 1, further comprising the procedures of:
   obtaining at least a second set of imaging parameters for at least a second sensor image of said at least one sensor image acquired by said imaging sensor;
   generating at least a second model image of said scene from said 3D geographic model, said second model image representing a 2D image of said scene as acquired in said 3D geographic model using said second set of imaging parameters;
   comparing said second sensor image and said second model image and determining the discrepancies therebetween;
   determining an updated 3D position and orientation of said imaging sensor respective of said second sensor image, in accordance with the discrepancies between said second sensor image and said second model image; and
   displaying supplementary content overlaid on said second sensor image, in relation to a selected location on said second sensor image, as determined based on said updated 3D position and orientation of said imaging sensor respective of said second sensor image.

7. The method of claim 1, wherein said supplementary content is displayed on at least a partially transparent display situated in the field of view of a user, allowing a simultaneous view of said sensor image presented on said display and of said scene through said display.

8. The method of claim 1, further comprising the procedures of:
   comparing a new sensor image with a previously georegistered sensor image and determining the discrepancies therebetween; and
   determining an updated 3D position and orientation of said imaging sensor when acquiring said new sensor image, in accordance with the discrepancies between said new sensor image and said previously georegistered sensor image.

9. A system for real-time image georegistration, the system comprising:
   a textured 3D geographic model of a scene, said 3D geographic model including imagery and texture data relating to geographical features and terrain, including artificial features, said 3D geographic model comprising a plurality of visual representations of real-world environments at different positions and viewing angles, including street-level views; and
   a user device communicatively coupled with said 3D geographic model, said user device comprising:
      at least one imaging sensor, configured to acquire at least one sensor image of a scene;
      at least one location measurement unit, configured to detect the 3D position and orientation of said imaging sensor when acquiring said sensor image;
      a processor, configured to obtain imaging parameters of the acquired sensor image, said imaging parameters comprising at least the detected 3D position and orientation of said imaging sensor when acquiring said sensor image as detected using said location measurement unit, said processor further configured to generate at least one model image of said scene from said 3D geographic model, said model image representing a 2D image of said scene as would be acquired in said 3D geographic model by a hypothetical image sensor using said imaging parameters, said model image comprising detailed textural image content besides edge features, said model image extractable from said 3D geographic model from different positions and viewing angles, said processor further configured to compare the detailed image content of said sensor image with the detailed image content of said model image and determine discrepancies therebetween, and to determine an updated 3D position and orientation of said imaging sensor in accordance with the discrepancies between said sensor image and said model image; and a display, configured to display in real-time supplementary content overlaid on said sensor image, in relation to a selected location on said sensor image, as determined based on said updated 3D position and orientation of said imaging sensor.

10. The system of claim 9, wherein said processor is configured to determine the geographic location coordinates of a scene element, using said 3D geographic model and said updated 3D position and orientation of said imaging sensor.

11. The system of claim 9, wherein said processor is configured to update the texture data of said 3D geographic model, in accordance with texture data obtained from said sensor image.

12. The system of claim 9, wherein said location measurement unit is selected from the list consisting of:
   a global positioning system (GPS);
   a compass;
   an inertial navigation system (INS);
   an inertial measurement unit (IMU);
   a motion sensor;
   a rotational sensor; and
   a rangefinder.

13. The system of claim 9, wherein said display comprises at least a partially transparent display situated in the field of view of a user, allowing a simultaneous view of said sensor image presented on said display and of said scene through said display.

14. The system of claim 9, wherein said display is selected from the list consisting of:
   a smartphone display screen;
   a camera display screen;
   a tablet computer display screen;
   eyeglasses;
   goggles;
   contact lenses;
   a wearable display device;
   a camera viewfinder;
   a head-up display (HUD);
   a head-mounted display (HMD); and
   a transparent display.

\* \* \* \* \*